(12) United States Patent
Morita

(10) Patent No.: US 6,885,460 B2
(45) Date of Patent: Apr. 26, 2005

(54) APPARATUS FOR AND METHOD OF MEASURING SURFACE SHAPE OF AN OBJECT

(75) Inventor: Nobuhiro Morita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 291 days.

(21) Appl. No.: 10/251,830

(22) Filed: Sep. 23, 2002

(65) Prior Publication Data

US 2003/0067609 A1 Apr. 10, 2003

(30) Foreign Application Priority Data

Sep. 21, 2001 (JP) .................................. 2001-289786

(51) Int. Cl.⁷ ................................................ G01B 9/02
(52) U.S. Cl. ...................................................... 356/514
(58) Field of Search ................................ 356/511, 512, 356/513, 514

(56) References Cited

U.S. PATENT DOCUMENTS

| | | | | |
|---|---|---|---|---|
| 5,321,497 A | * | 6/1994 | Ai et al. ...................... | 356/514 |
| 5,485,275 A | * | 1/1996 | Ohtsuka ...................... | 356/513 |
| 5,548,396 A | | 8/1996 | Morita et al. | |
| 5,844,670 A | | 12/1998 | Morita et al. | |
| 6,266,141 B1 | | 7/2001 | Morita | |
| 6,312,373 B1 | * | 11/2001 | Ichihara ...................... | 356/515 |
| 6,344,898 B1 | * | 2/2002 | Gemma et al. .............. | 356/513 |

FOREIGN PATENT DOCUMENTS

| JP | 2000-221013 | 8/2000 |
|---|---|---|
| JP | 2001-41724 | 2/2001 |

OTHER PUBLICATIONS

M. Ishihara, et al., Journal of Japan Society for Precision Engineering, vol. 63, No. 1, pp. 124–128, "High Speed 3–D Shape Measuring Apparatus Using Shape from Focus Method", 1997.

G. Pedrini, et al., Optics & Laser Technology, vol. 29, No. 5, pp. 249–256, "Quantitative Evaluation of Two–Dimensional Dynamic Deformations Using Digital Holography", 1997.

* cited by examiner

Primary Examiner—Samuel A. Turner
Assistant Examiner—Michael A. Lyons
(74) Attorney, Agent, or Firm—Oblon, Spivak, McClelland, Maier & Neustadt, P.C.

(57) ABSTRACT

An apparatus for measuring an object's surface shape that obtains complex amplitude at a plurality of positions substantially in the directions of the optical axis of the light reflected by the object and calculates the first surface shape of the object by the depth-from-focus principle. On the other hand, using the phase data of the complex amplitude, the apparatus can measure a micro shape in the sub-fringe order by ordinary laser interference measurement. The first surface shape data are applied to a region including a step of a height greater than ½ of the light's wavelength and second surface shape data are applied to the other region.

29 Claims, 7 Drawing Sheets

DEFOCUS ABERRATION

APPARATUS FOR AND METHOD OF MEASURING SURFACE SHAPE OF AN OBJECT

BACKGROUND OF THE INVENTION

1. Field of the Invention

The present invention generally relates to an apparatus for and a method of measuring the surface shape of an object, and more particularly, to the measurement of the surface shape of an object that includes a step of a height greater than ½ of the wavelength.

2. Description of the Related Art

A laser interferometer is known as an apparatus for measuring the surface form of an object in the range of the wavelength of light. For example, a laser interference system manufactured by Zygo Corp. is available in the market. The laser interferometer takes a plurality of interference fringe images using an imaging device such as a CCD with a reference beam of which phase is modulated, obtains the phase of reflected beam from the object based on the interference fringes, and obtains the shape of the object based on the phase data at the range of the wavelength of the reference beam.

However, if the object includes therein a step of more than ½ the wavelength, the step makes the unwrapping of the phase impossible and causes a phase discontinuity, and the result of the measurement consequently includes an uncertainty.

A scanning white light interferometer, a 3-D surface profiler of Zygo Corp., for example, solves the problem by expanding the measurement range λ/2 in the directions of the beam axis for a single wavelength based on the correlation phase data measured using a plurality of wavelengths (multiple wavelengths measurement). In the case where the step is greater, one measures absolute length of the object by scanning either the interferometer or the object in the directions of the beam axis and detecting the positions of the white interference fringes and the moving length of the interferometer or the object since white interference fringes appear only when the light path lengths of the reference beam and the reflected beam from the object are substantially equal.

However, in the case where a user measures a large step with the scanning white light interferometer, the measurement takes a long time because the user must move either the object or the interferometer in the directions of the light axis. Additionally, since the user must move the object or the interferometer during the measurement and measure the moving distance of the interferometer or the object, more error in measurement may be involved. The range of measurement in the light path directions is limited by the movable range of the interferometer or the object.

Japanese Laid-open Patent Application No. 2000-221013 discloses an invention of a scanning white light interferometer that reduces the interference fringe images in number and consequently speeds up the measurement so that the user can measure the shape of an object including steps and absolute lengths greater than the wavelength with high precision and at high speed without making a mistake.

Japanese Laid-open Patent Application No. 2001-41724 discloses an invention of an apparatus for measuring surface shape using an interferometer that employs the phase shift method using birefringence so that the user can measure the 3-dimensional shape of the surface of a measurement object with high precision without moving the measurement object. If an electro-optic component is used instead of a phase plate to shift the phase of the reference beam, the user can speed up the measurements.

Moreover, the method based on the depth from focus theory is a technique to obtain the shape of an object based on the intensity data obtained by measuring the object by a CCD. One obtains a position at which the light goes into focus based on a plurality of images taken while changing the focal length, and obtains the surface shape of the object. (Refer to "High-speed 3-dimensional measurement of shape by the depth-from-focus method" Journal of Japan Society for Precision Engineering, vol. 63, No. 1, 1997, M. Ishihara, H. Sasaki, for example).

However, the technique disclosed in Japanese Laid-open Patent Application No. 2000-221013 still includes a mechanical portion therein since it employs the phase modulation method (phase shift method) to measure in the sub-fringe order and requires taking a plurality of images. Accordingly, this technique can reduce the time required for measurement to some extent compared with the scanning white light interferometer, but it is considered that this technique cannot speed up the measurement beyond a certain limit. This technique is not applicable to the measurement of dynamic change in shape of a moving object. Additionally, the problem that the mechanical aspect of this technique increases error factors in the measurement still remains.

The technique disclosed in Japanese Laid-open Patent Application No. 2001-41724 is basically the measurement of the interference of a laser beam based on the phase shift method. As described above, this technique cannot measure a surface including a step of more than ½ wavelength due to uncertainty. Additionally, this technique also speeds up the measurement to some extent, but it still requires taking a plurality of images. Accordingly, this technique cannot reduce the time required for the measurement and consequently is not applicable to dynamic measurement of moving shapes.

Moreover, the technique based on the depth-from-focus theory is generally not suitable to the measurement of an object having shapes of sub-fringe order since the resolution in measurement of this technique is lower than that of the laser interference. It is possible to improve the resolution to a certain extent by increasing the magnification of the optical system, but the transverse range of measurement (field of view) is reduced if the resolution is increased up to the same level as the laser interference. Since this technique requires taking a plurality of images as the focal length is changed, it requires at least the time to take the plurality of images, whatever method is used to take the images. Because this technique also requires a precise mechanism to adjust the focal length of a lens, the structure of the equipment becomes complicated. The mechanical portion of the equipment increases error factors and the measurable range in the directions of the beam axis is limited by the movable range of a moving portion of the equipment.

SUMMARY OF THE INVENTION

Accordingly, it is a general object of the present invention to provide a novel and useful apparatus for, method of, and computer program for measuring surface shapes.

Another and more specific object of the present invention is to measure the surface of an object including steps larger than ½ wavelength of the light source in the sub-fringe order precisely and easily without physically moving the object or the optical system during the measurement.

Yet another object of the present invention is to measure the surface of the measured object in the case where it is impossible to detect the defocusing due to the low contrast of 2-dimensional amplitude data and it is impossible to optically observe the texture of the surface with the amplitude due to the flatness of the surface of the measured object.

Yet another object of the present invention is to make the observation of the position and attitude of the measured object easy so as to improve the maneuverability of the measurement.

Yet another object of the present invention is to generate a depth-from-focus image at a high speed and to take more natural images of the measured object.

Yet another object of the present invention is to generate a more accurate depth-from-focus image, to adjust more accurately the position and attitude of the measured object, and to make the measurement quick and precise.

Yet another object of the present invention is to accurately measure the dynamic shape of an object even if the object is moving fast.

Yet another object of the present invention is to remove defocus aberration and to accurately perform the measurement with an optical system of which magnification is increased.

Yet another object of the present invention is to measure a wider range of the surface of the measured object at a time.

Finally, yet another object of the present invention is to make it easy to measure a wider range of the surface of the measured object at a time.

To achieve one or more of the above objects, an apparatus for measuring the surface shape of an object, according to the present invention, includes a light source that emits light to illuminate said object, an interference optical system that generates interference fringes between a reference fraction of said light and a reflective fraction of said light reflected by said object, an imaging capturing unit that captures said interference fringes and outputs interference fringe data, and a computer unit that obtains phase data indicating the phase of said reflective fraction of said light and amplitude data indicating the amplitude of said reflective fraction of said light at a plurality of positions in the directions of the optical axis of said reflective fraction of said light using said interference fringe data, obtains first surface shape data, based on the in-focus principle, indicating the surface shape of said object by determining an in-focus position in the directions of the optical axis of said reflective fraction of said light, at which said reflective fraction of said light comes into focus, using said amplitude data, obtains second surface shape data, based on the interference principle, indicating the surface shape of said object, using said phase data, and obtains third surface shape data indicating the surface shape of said object by combining or comparing said first surface shape data with said second surface shape data.

The apparatus for measuring a surface shape showed obtains complex amplitude at a plurality of positions substantially in the directions of the optical axis of the light reflected by the object and calculates the first surface shape of the object by the depth-from-focus principle that determines whether the portion of an image is in focus using the amplitude data.

On the other hand, using the phase data of the complex amplitude obtained from the interference fringe data, the apparatus can measure a micro shape of the sub-fringe order in the same manner as the apparatus measures by the ordinary laser interference. Accordingly, the first surface shape data calculated based on the amplitude data are applied to a region including a step of a height greater than ½ of the wavelength and the second surface shape data calculated based on the phase data are applied to the other region. The apparatus can measure the surface including a step of a height more than ½ of the wavelength in the sub-fringe order by combining or comparing the first surface shape data and the second surface shape data.

Other objects, features, and advantages of the present invention will become more apparent from the following detailed description when read in conjunction with the accompanying drawings.

BRIEF DESCRIPTION OF THE INVENTION

DETAILED DESCRIPTION OF THE PREFERRED EMBODIMENTS

The preferred embodiments of the present invention will be described in detail below.

Figure 1:
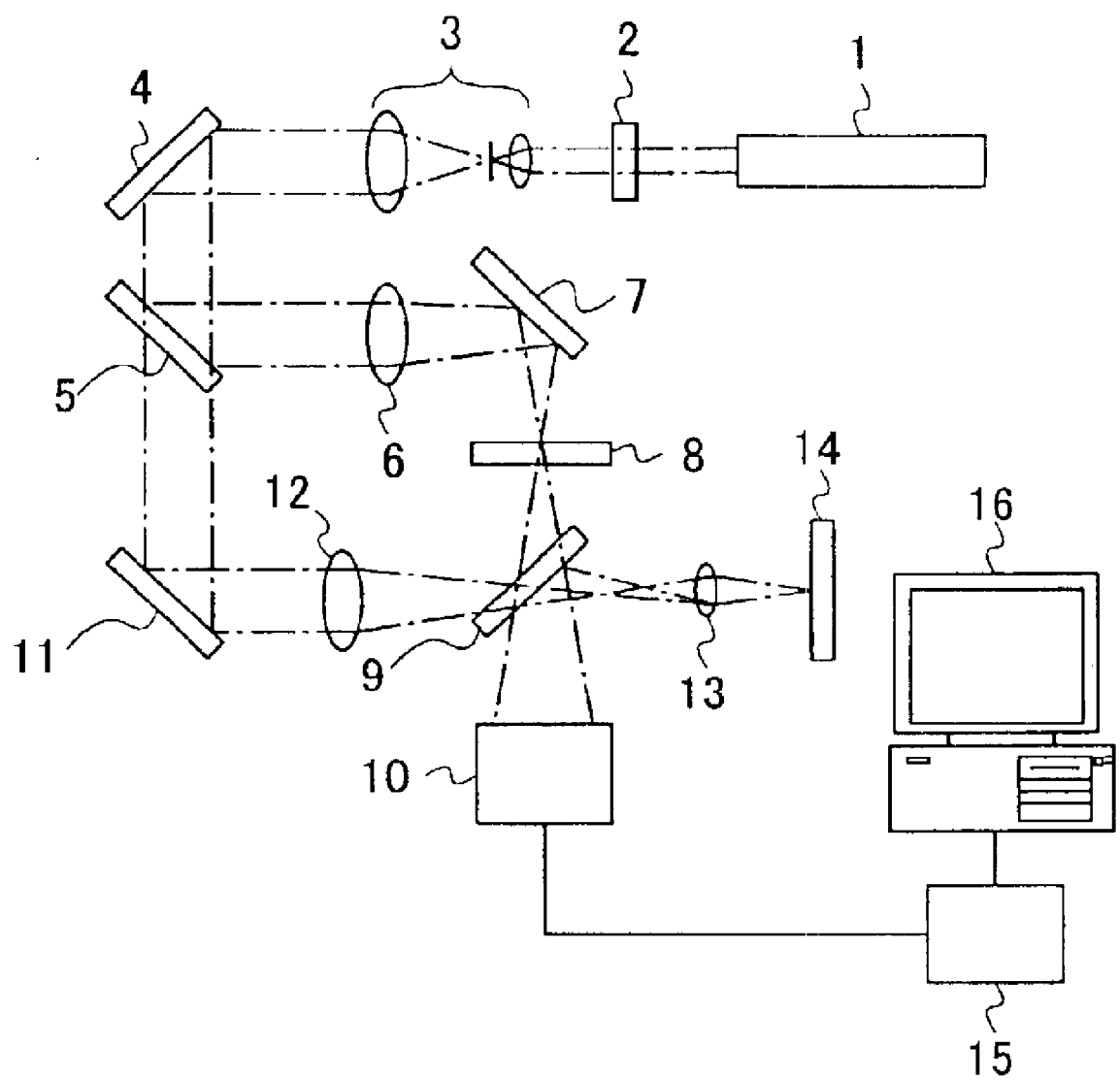
FIG. 1 is a block diagram showing the configuration of an apparatus for measuring surface shape according to an embodiment of the present invention.

FIG. 1 is a block diagram showing the rough structure of an apparatus for measuring surface shape according to an embodiment of the present invention. As showed in FIG. 1, this apparatus for measuring surface shape includes a He—Ne laser 1 as a light source, an ND filter 2 for adjusting the intensity of the laser beam emitted by the He—Ne laser illuminating the measured object 14, and a beam expander 3 for expanding the laser beam. The beam expander 3 also functions as a spatial filter.

The beam expanded by the beam expander 3 is bent (reflected) by a mirror 4 and enters a beam splitter 5. The fraction of the beam reflected by the beam splitter 5 travels through a lens 6 for converting the beam into a spherical wave, is bent by a mirror 7, and enters an image device CCD 10 through an ND filter 8 and a half mirror 9. This fraction of the beam functions as a reference beam that interferes with another fraction of the beam reflected by the measured object 14.

On the other hand, the other fraction of the beam traveling through the beam splitter 5 is bent by a mirror 11 and converted into a spherical wave by a lens 12. The other fraction of the beam travels through the half mirror 9, is converted into a substantially parallel beam, and illuminates the measured object 14. The fractional beam reflected by the measured object 14 travels through the object lens 13, is reflected by the half mirror 9, and reaches the CCD 10 as an object beam so that it interferes with the reference beam to generate interferential fringes. These optical components constitute an interferential optical system. The interferential fringes are taken by the CCD 10 and transferred to and stored by a computer 16 through a flame grabber 15.

The lengths of the reference optical path and the object optical path after the beam is split by the beam splitter 5 are set so that the lengths are shorter than the coherence length of the light source He—Ne laser 1. Additionally, the intensity of the beam illuminating the measured object 14 is adjusted by the ND filter 2 so that the fractional beam reflected by the measured object 14 becomes as strong as suitable for image taking by the CCD 10. Moreover, the intensity of the reference beam is adjusted by the ND filter 8 so that the interference between the object beam from the measured object 14 and the reference beam generates interferential fringes of high contrast.

The object lens 13 functions so that it converts the fractional beam reflected by the measured object 14 into a spherical wave, which enlarges the image when the complex amplitude (the image of the measured object 14) of the reflected fractional beam from the measured object 14 is reproduced. The positional relationship between the lens 12 and the object lens 13 is adjusted so that the beam illuminating the measured object 14 becomes substantially parallel. The lens 6 functions for converting the reference beam into a spherical beam and the position of the lens 6 is adjusted so that the curvature of the fractional beam reflected by the measured object 14 that is converted into a spherical wave and the curvature of the reference beam are substantially equal to each other at the position of the image taking by the CCD 10.

In the case where the image of the measured object 14 does not need to be enlarged, the object lens 13, and consequently, the lens 6, and the lens 12 are not necessary. As being described later, the interference fringes are regarded as a hologram and the complex amplitude of the reflected beam from the measured object 14 (the image of the measured object 14) is reproduced from the diffracted light wave obtained by imaginarily illuminating the reference beam to the hologram interference fringes captured by the CCD 10. In the case where a single item of data indicating the interference fringes is acquired by the CCD 10 to reproduce the reflected beam of the measured object 14, three images, that is, the diffraction light of the $0^{th}$ order that passes through the hologram, the real image, and the imaginary image, are reproduced. In order to separately reproduce the three images, the optical axis of the reflected beam from the measured object 14 and the optical axis of the reference beam are appropriately inclined to each other so that a carrier frequency can be imposed on the interference fringes. The inclination between the two optical axes is adjustable by changing the tilt of the mirror 7, the measured object 14, or the half mirror 9.

The method of obtaining the complex amplitude (the amplitude and the phase of light) of the reflected beam from the measured object 14 (the image of the measured object 14) will be described below.

The intensity of the interference fringes generated by the interference between the reflected light from the measured object 14 and the reference light at the position of image acquisition by the CCD 10 is expressed by the formula (1).

$$I(x,y)=|R|^2+|A(x,y)\cdot\exp\{i\cdot\phi(x,y)\}|^2+R^*\cdot A(x,y)\cdot\exp\{i\cdot(x,y)\}+R\cdot A(x,y)\cdot\exp\{i\cdot\phi(x,y)\}^* \quad (1)$$

In the above formula (1), "I" stands for the intensity of the interference fringes, "x" and "y" stand for the x-coordinate and the y-coordinate, respectively, of the image acquisition position of the CCD 10, "R" stands for the complex amplitude of the reference light, and "A" and "φ" stand for the amplitude and the phase, respectively, of the reflected light from the measured object 14.

The interference fringes are captured by the CCD 10 and stored in the computer 16 as hologram image data. In the case of holography using a dry plate, reference light that is applied to the dry plate (hologram) storing the interference fringes therein is diffracted by the interference fringes, and the diffracted reference light functions as light reflected by the object at the recording. Accordingly, the object reflective light (the image of the object) is reproduced. In the case of an embodiment of the present invention, the reference light is not actually applied to the hologram, but the reference light is assumed to be virtually applied to the hologram. The object reflective light (the object image) is reproduced from the hologram image recorded by the CCD 10 using Fresnel's approximation. Under the assumption that parallel light is applied to the hologram as the reference light, light diffracted by the hologram, that is, the object reflective light, can be expressed by the following formula:

$$U(x', y') = C \cdot \exp\left\{\frac{i \cdot \pi}{\lambda \cdot d}(x'^2 + y'^2)\right\} \cdot \iint I(x, y) \cdot \exp\left\{\frac{i \cdot \pi}{\lambda \cdot d}(x^2 + y^2)\right\} \cdot \exp\left\{\frac{2 \cdot i \cdot \pi}{\lambda \cdot d}(x \cdot x' + y + y')\right\} dx dy \quad (2)$$

In the above formula, "U" stands for the complex amplitude of the object reflective light at an image position that is distant by a distance "d", "x" and "y" stand for the x-coordinate and y-coordinate at the image position, "c" stands for a complex constant, and "λ" stands for the wavelength of the light source.

Accordingly, the complex amplitude of the object reflective light at the distance "d" is calculated based on the above formula (2) by inputting the recorded interference fringe data and the distance "d". If the enlargement of the image of the measured object 14 is not desired, the distance between the image capturing position of the CCD 10 and the surface of the measured object 14 is to be assigned to the distance "d". If the image of the measured object 14 is desired to be enlarged, the distance between the image plane enlarged by the object lens 13 and the image capturing position of the CCD 10 as showed in FIG. 1 is assigned to the distance "d".

Figure 2:
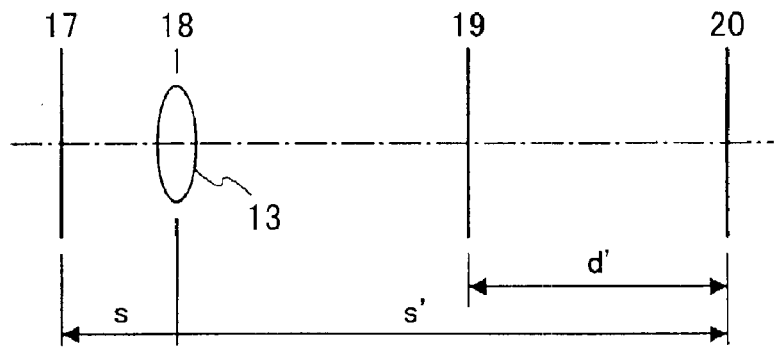
FIG. 2 is a schematic diagram showing the positional relationship among optical components included in the apparatus for measuring surface shape showed in FIG. 1.

FIG. 2 is a schematic diagram showing the positional relationship among the measured object 14, the object lens 13, the hologram face (the image capturing position of the CCD 10), and the image of the measured object 14 enlarged by the object lens 13 showed in FIG. 1. In FIG. 2, reference numeral 17 indicates the position of the measured object 14; reference numeral 18 indicates the position of the object lens 13; reference numeral 19 indicates the position of the hologram face (the capturing position of the CCD 10); and reference numeral 20 indicates the position of the image face of the measured object 14 enlarged by the object lens 13.

The distance "d" showed in FIG. 2 is the reproduction distance "d". The image of the measured object 14 is calculated by assigning the distance "d'" to "d" in the formula (2). The distance "s" and the distance "s'" satisfy formula (3) to be described below, that comes from the lens imaging. Accordingly, one can calculate the distance "s'" by measuring the focal length "f" of the object lens 13 and the distance "s" in advance. If the CCD 10 is disposed so that the distance between the image capturing position and the object lens 13 (position 18) substantially becomes "s'", the distance d' becomes substantially zero. Accordingly, the user can obtain the image of the measured object 14 that is almost focused to the extent that it is visible and makes it easy to adjust the position of the measured object 14, for example. Additionally, since the fringe of the reproduced image may be distorted in the case that the distance d' is large, the above method is effective in reducing the distortion contained in the reproduced image.

$$\frac{1}{f} = \frac{1}{s} + \frac{1}{s'} \quad (3)$$

In the case of reproduction, the reproduced image includes three types of images: an image generated by the fraction of light that passes through the hologram (the $0^{th}$ order diffractive light), a real image, and an imaginary image. The real image is used to obtain the shape of the measured object 14. In the case of recording, if the light axis of the object reflective light and the reference light are almost parallel, the three types of images overlap. As described above, one can separate the three types of images by inclining the light axis of the object reflective light to the light axis of the reference light so that the hologram (the interference fringe image) is captured with carrier frequency superimposed onto the interference fringe.

The amplitude A and the phase φ of the reflective light from the measured object 14 are given by the real part of the complex amplitude to be calculated by the formula (2), expressed as Real{U(x',y')}, and the imaginary part, expressed as Imaginary{U(x',y')}, as follows:

$$A = \sqrt{|\text{Real}\{U(x', y')\}|^2 + |\text{Imaginary}\{U(x', y')\}|^2} \quad (4)$$

$$\phi = \tan^{-1}\left[\frac{\text{Imaginary}\{U(x', y')\}}{\text{Real}\{U(x', y')\}}\right] \quad (5)$$

The amplitude A calculated by the formula (4) and the phase φ calculated by the formula (5) correspond to the amplitude data and the phase data, respectively. The phase φ is converted into a value having the unit of length by multiplying by λ/4π and is unwrapped if there is a jump of phase. The shape of the measured object 14 is consequently obtained with the precision under the wavelength λ of the light source.

However, in the case where there is a step on the surface of the measured object 14, the step being greater than λ/2, the phase φ (shape) is not continuous at the step, which causes uncertainty in the measurement.

To avoid this problem, the apparatus for measuring surface shape according to this embodiment measures the surface shape of the measured object 14 by using the amplitude data calculated by the formula (4). Accordingly, the apparatus can measure the surface shape where a step greater than λ/2 exists by comparing the measurement of the surface shape obtained from the amplitude data and the measurement of the surface shape obtained from the phase data and/or using a composite of the amplitude data with the phase data. The technique will be described in detail below.

Figure 3:
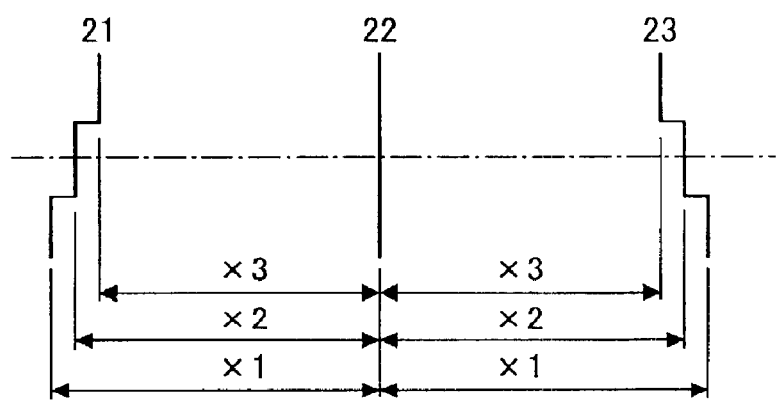
FIG. 3 is another schematic diagram showing the positional relationship among optical components included in the apparatus for measuring surface shape showed in FIG. 1.

The measurement of the surface shape using the amplitude data will be described first. For ease of a description, the case where the image of the measured object 14 is not enlarged is described by reference to FIG. 3 showing the positional relationship among the measured object 14, the hologram face (the image capture position of the CCD 10), and the reproduced image. In FIG. 3, reference numeral 21 indicates the position of the measured object 14; reference numeral 22 indicates the position of the hologram face (the image capture position of the CCD 10); and reference numeral 23 indicates the reproduced image of the measured object 14.

In the case where the hologram (the image capturing position of the CCD 10) is located at the origin, if the reproduction distance "d" is −x1, a real image comes into focus on the plane at the distance x1. Similarly, if the reproduction distance "d" is −x2 and −x3, a real image comes into focus on the plane at the distance x2 and x3, respectively. If d=−x1, the real images reproduced on the planes at the distances x2 and x3 are out of focus. Accordingly, the relative difference in distance (that is, the step) among x1, x2, and x3 is obtainable by determining whether the real image is in focus.

In order to determine whether an image is in focus, the apparatus performs an operation based on the depth-from-focus theory using the amplitude data calculated by the formula (4). Various algorithms are developed for the operation of the depth from focus theory. The algorithm described in Ishihara M. et al., "A high speed measurement of 3D shape using the depth-from-focus method" Journal of the Japan Society for Precision Engineering, vol. 63, No. 1, 1997, for example, is used in this embodiment.

As the reproduction distance d is changed by a small value (Δd), a plurality of complex amplitudes are calculated using the formula (2) and amplitude data corresponding to each reproduction distance d are calculated by the formula (4). An in-focus measure "v" is defined as the sum of the differential values of the amplitude "A", calculated for each set of amplitude data, in an arbitrary micro region "L" in the imaging face of the CCD 10. The reproduction distance "d" corresponding to the peak in the in-focus measure "v" is determined to be the position that comes into focus.

Figure 4:
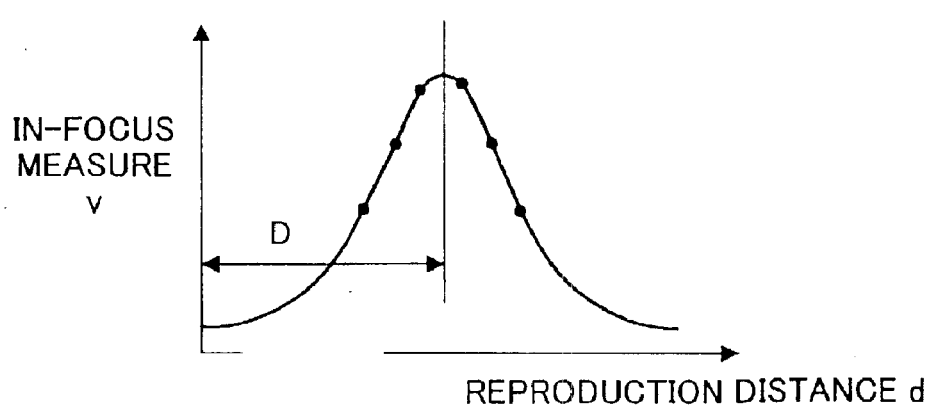
FIG. 4 is a graph showing the functional relationship between a reproduction distance and an in-focus measure based on a measurement using the apparatus for measuring surface shape showed in FIG. 1.

FIG. 4 is a schematic diagram showing the change in the in-focus measure v, as the reproduction distance d is changed, of an arbitrary micro region L of the captured image. The distance D showed in FIG. 4 is the reproduction distance d (in-focus distance D) at which an arbitrary micro region L in the captured image comes into focus. Accordingly, the in-focus distance D in each micro region L in the entire surface of the measured object 14 is calculated by obtaining a reproduction distance d for the sum of the differential values of the amplitude A in an arbitrary micro region L and repeating the obtaining process over the entire image. Then, the entire surface shape of the measured object 14 is obtained by defining an arbitrary micro region as the reference micro region and calculating the difference in reproduction distance based on the reference micro region. Accordingly, surface shape data $S_{ij}$ of the measured object 14 for each pixel of the captured image are obtained. "I" and "j" indicate the coordinates of the captured image measured by the pixel.

When the in-focus measure v is obtained, the complex amplitude U of the reflective light from the measured object 14 is calculated, as the reproduction distance d is gradually changed, at a plurality of positions in the directions of the light axis of the light reflected from the measured object 14. In this case, it is desired that the step Δd of the change in the reproduction distance d be smaller than ½ of the wavelength λ. As showed in FIG. 4, one may obtain the in-focus distance D by approximating the data of the in-focus measures v by a function such as a Gaussian function and obtaining the peak of the function. In this case, it is not necessary that the step Δd of the change in the reproduction distance d be strictly smaller than ½ of the wavelength λ.

A sensitivity γ of the measurement using the amplitude data, in the vertical directions, is expressed using a constant k and a magnification β of the optical system in accordance with the formula (6) and the resolution is in inverse relation to the second power of the magnification β.

$$\gamma = \frac{k}{\beta^2} \quad (6)$$

On the other hand, when one measures a step of ½ of the wavelength λ by the method that uses the amplitude data, a measurement resolution smaller than ½ of the wavelength λ is required.

Since the wavelength of the visible light is of hundreds nm, the measurement using the amplitude data requires a resolution of nm order. It would be difficult to satisfy this requirement without enlarging the image of the measured object 14. Accordingly, the apparatus showed in FIG. 1 is structured so that it enlarges the image of the measured object 14 with the object lens 13. However, in the case where the light source which has the long wavelength, μm or mm order, is used, it is possible to satisfy the resolution required for the measurement using the amplitude data without enlarging the image of the measured object 14.

A method of measuring a shape smaller than λ/2 on the surface of the measured object 14 using the phase data calculated by the formula (5) will be described below. This is the case where the lenses 6, 12 and the object lens 13 showed in FIG. 1 are not used so that the image of the measured object 14 is not enlarged.

That is, in an arbitrary micro region, the phase data are calculated by the formula (4) using the complex amplitude reproduced at the distance at which the image comes into focus by the method using the amplitude data. The surface shape of the measured object 14 is obtained by multiplying λ/4π by the calculated phase φ to convert units of phase into units of length. The surface shape data of the measured object 14 are obtained for each pixel of the captured image.

In the case that the image of the measured object 14 is enlarged by the object lens 13, if the curvature of the reflected light from the measured object 14 and the curvature of the reference light are not equal, the difference in curvature causes the measurement of the phase φ to include concentric circles shaped by defocus aberration. The accurate measurement of the surface shape of the measured object 14 requires the elimination of the defocus aberration.

When the curvature of the light reflected from the measured object 14 and the curvature of the reference light are substantially equal, the defocus aberration does not appear in the phase data. Therefore, for the complex amplitude reproduced by assigning the reproduction distance d at which the image is determined as being in focus by the method using the amplitude data, the formula (5) gives the phase data in an arbitrary micro region L. The calculated phase φ is converted into a length-dimensional value by multiplying λ/4π to obtain the surface shape of the measured object 14. The calculation consequently gives the surface shape data $T_{ij}$ of the measured object 14 for each pixel of the captured image. "I" and "j" indicate the coordinates measured by the pixel in the captured image.

The next description is about a method of combining the shape data $S_{ij}$ obtained from the amplitude data and the shape data $T_{ij}$ obtained from the phase data. The shape data element $S_{ij}$ is divided by λ/2 to obtain a quotient m. The shape data element $S_{ij}$ multiplied by integer m and λ/2 is assigned to a shape data element $Z_{ij}$. This operation is repeated for each pixel of the captured image to obtain an accurate measurement of the surface shape even if the surface includes a step greater than λ/2.

The above process may be explained from a different angle as follows. The accurate data of the surface shape including a step larger than ½ of the wavelength of the light source is indicated by $Z_{ij}$; the wavelength of the light source is indicated by λ; the order is indicated by $m_{ij}$; the shape obtained from the phase data is indicated by $\delta_{ij}$. Since the following equation (7) is satisfied, the order $m_{ij}$ is obtainable for each pixel of the captured image.

$$Z_{ij} = m_{ij} \cdot \frac{\lambda}{2} + \delta_{ij} \quad (7)$$

As described above, the above method of measurement makes possibly the precise measurement of a surface including a step larger than ½ of the wavelength λ in the sub-fringe order without moving the measured object 14 and/or the optical system during the measurement.

The computer 16 performs the above measurement to obtain the shape data $Z_{ij}$. The operation will be described below.

Figure 6:
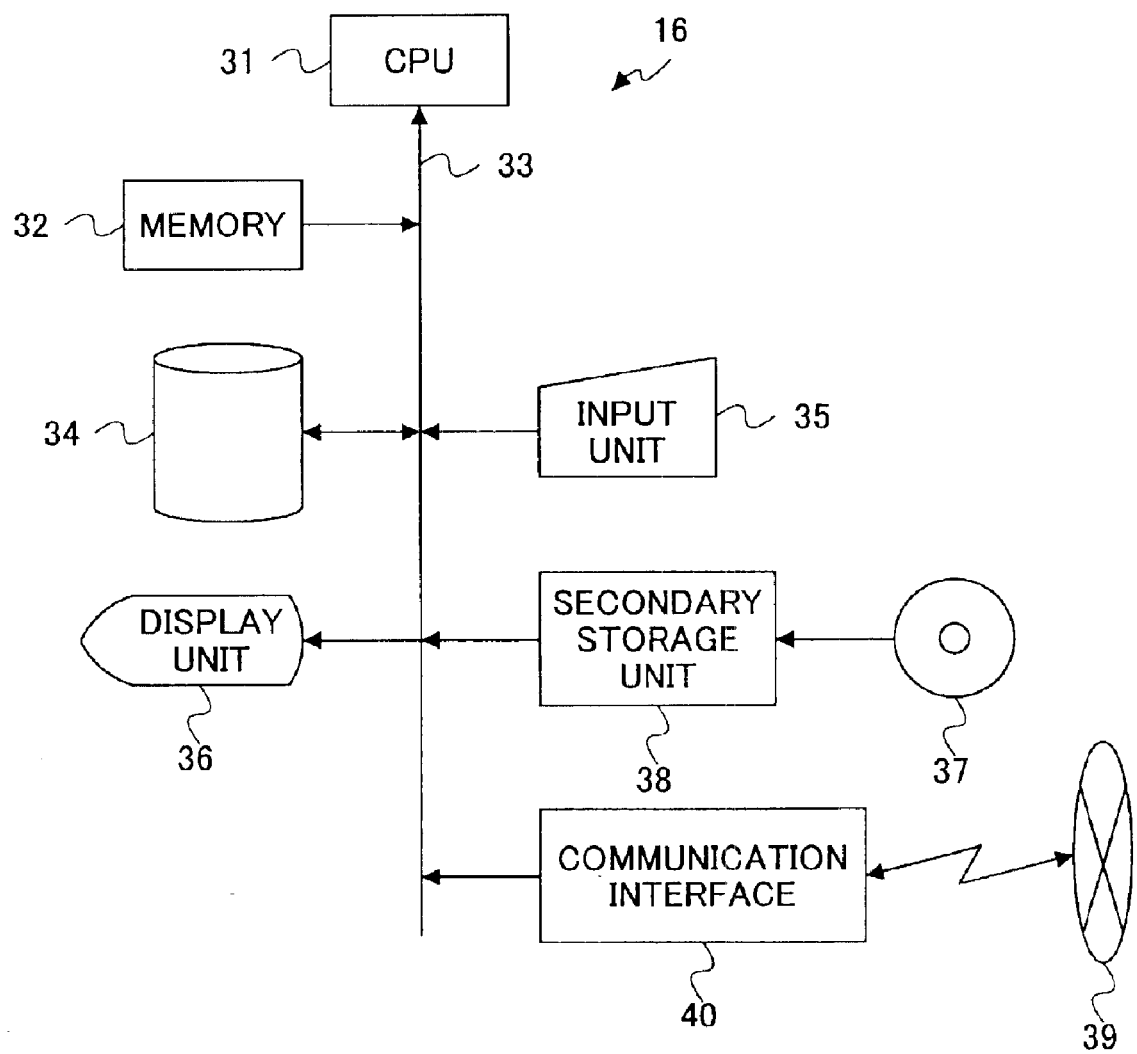
FIG. 6 is a block diagram showing the configuration of a computer included in the apparatus for measuring surface shape showed in FIG. 1.

FIG. 6 is a block diagram showing the components of the system. As showed in FIG. 6, the computer 16 is structured as follows: a CPU 31 that performs various operations and controls the other components of the computer 16, a memory unit 32 consisting of various ROMs and RAMs, a bus 33 connecting the CPU 31 and the memory unit 32.

The other components connected to the bus 33 are as follows: a magnetic storage unit 34 such as a hard disk drive, an input unit 35 consisting of a mouse, a keyboard, and so forth, a display unit 36 such as LCD, CRT, and so forth, a recording media reading unit 38 that reads a recording medium 37 such as an optical disk, and a communication interface 40 that enables the computer 16 to communicate via a network 39 such as the Internet. The recording medium 37 is a recording medium according to an embodiment of the present invention and may include various types of media such as an optical disk including a CD and a DVD, a magneto-optical disk, and a flexible disk. Likewise, the recording media reading unit 38 may include various types of storage devices such as an optical disk drive, a magneto-optical disk drive, and/or a flexible disk drive, for example, corresponding to the type of the recording medium 37.

The magnetic storage unit 34 stores therein a computer program according to an embodiment. The computer program may be installed into the magnetic storage by reading the recording medium 37 with the recording medium reading unit 38 or downloading from the network 39 such as the Internet. The installed computer program enables the computer 16 to measure the shape data $Z_{ij}$. This computer program may be an application program that operates on a predetermined operating system.

The measurement of the shape data Zij that the computer 16 performs based on the installed computer program will be described by reference to the flow chart showed in FIG. 7.

Figure 7:
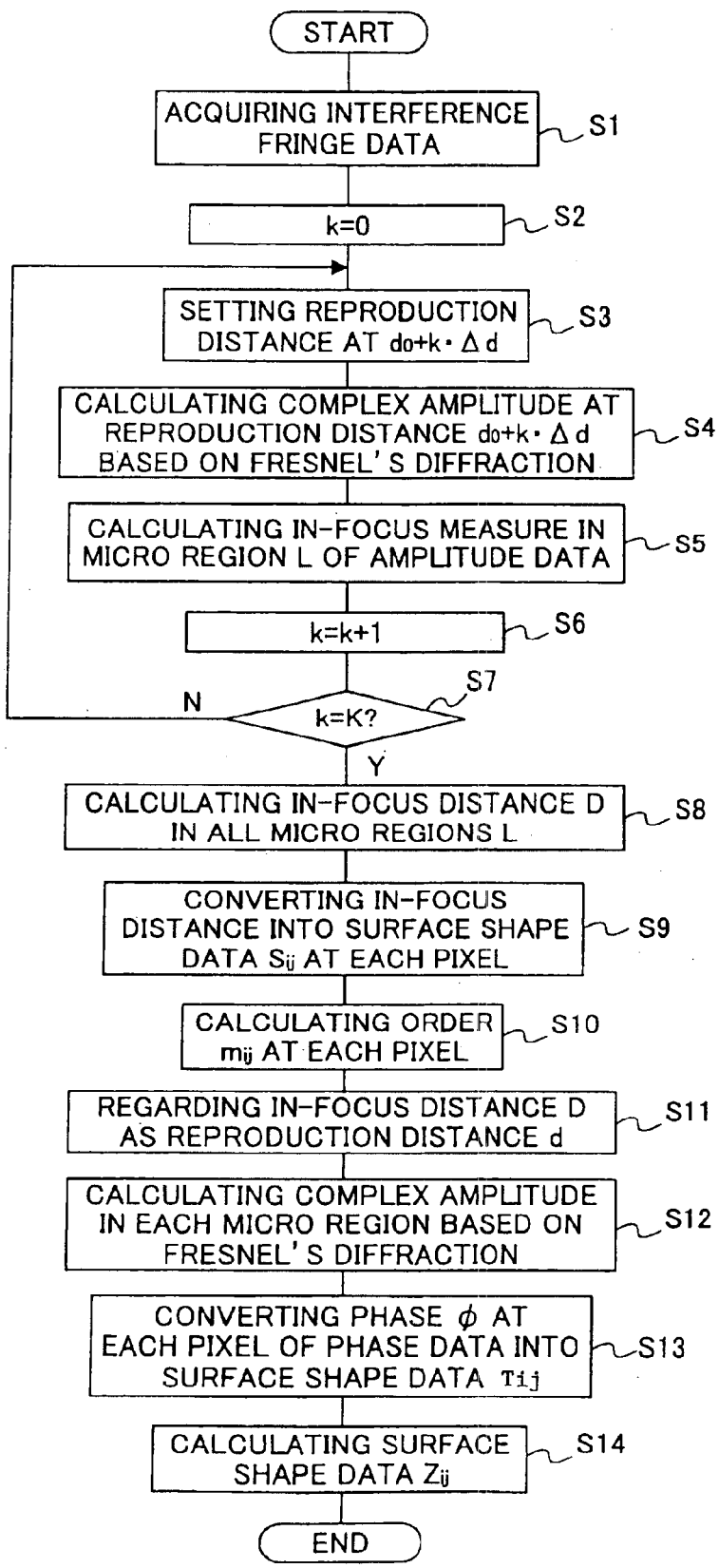
FIG. 7 is a flow chart showing the algorithm of the measurement according to an embodiment of the present invention.

As showed in FIG. 7, the CPU 31 obtains the data of the interference fringe of which image is captured by the CCD 10 and stores the data in the memory 32 (step S1). The CPU 31 resets a predetermined counter value k stored in a predetermined region in the memory 32 (step S2).

The CPU 31 adds the multiple of an infinitesimal value Δd of the reproduction distance d and a count value to the initial value d0 of the reproduction distance d (step S3) and calculates the complex amplitude at the reproduction distance d0+Δd*k using Fresnel's diffraction calculation (step S4). The CPU 31 obtains the in-focus measure of the micro region L of the amplitude data of the complex amplitude (step S5), and increases the counter value k by +1 (step S6). Steps S3 through S6 are repeated until the count value k reaches a predetermined value K (N branch of step S7).

When the count value k reaches the predetermined value K (Y branch of step S7), the CPU 31 calculates the in-focus distance at each micro region L to obtain the in-focus distance D for all micro regions L (step S8) and further obtains the surface shape data Sij from the in-focus distance D (step S9).

Next, the CPU 31 calculates the order mij of each pixel (step S10), assigns the in-focus distance D of the micro region L to the reproduction distance d (step S11), and calculates the complex amplitude of each micro region L by Fresnel's diffraction calculation (step S12).

The phase φ of the complex amplitude is converted into the surface shape data Tij (step S13).

Finally, the CPU 31 combines or compares the surface shape data Sij and the surface shape data Tij obtained in the above manner to obtain the surface shape data Zij (step S14).

In the above process, the in-focus distance D of each micro region L is obtained by the in-focus method using the amplitude data, the complex amplitude of each micro region L is re-calculated by repeating Fresnel's diffraction calculation (step S12), and the phase data of each micro region L are obtained again. Fresnel's diffraction calculation is time-consuming and the calculation of the phase data for all pixels takes a long time. In the case that the obtained in-focus distance D is quite small compared with the initial position, the phase data of the initial position do not result in a large error. Therefore, Fresnel's diffraction calculation may be unnecessary in this case so that the time for the calculation and measurement is reduced.

The apparatus for measuring surface shape showed in FIG. 1 measures the complex amplitude of the light reflected by the measured object 14 using the interference fringe with the carrier frequency superposed thereon. If a user can modulate the phase of the reference light and the phase of the reflected light, the user can use a coaxial interference fringe that contains no superposed carrier frequency to independently calculate the complex amplitude of the light reflected from the measured object 14. The user can obtain the surface shape data from this complex amplitude. In the case where the wavelength λ of the He—Ne laser 1 is long enough, the complex amplitude of the light reflected from the measured object 14 is directly measurable by the CCD 10. The user can use this complex amplitude to measure the surface shape in this case.

The apparatus for measuring surface shape showed in FIG. 1 can dynamically measure the surface shape of an object at a moment at which the surface shape is changing if the surface shape changes more slowly than the CCD 10 captures the image of the surface shape. As the change becomes faster, it becomes difficult to accurately obtain the complex amplitude of the reflected light since the intensity and the phase of the light reflected by the measured object 14 changes during the capture of the image.

Even in this case, the user can dynamically and accurately measure the complex amplitude of the reflected light by applying a sufficiently short pulse of light and capture the image of the surface shape in the short moment. Because the measured object 14 can be regarded as being still during the pulse of light, the light reflected by the measured object 14 is stable.

A pulse-type solid laser such as a ruby laser and a YAG laser, and a pulse-type semiconductor laser are suitable as a light source to emit the light pulse. However, a CW-type semiconductor laser that is pulse-modulated and a CW-type noble gas laser such as a He—Ne laser and an Ar laser of which beam is chopped by a rotative chopper are also usable.

Alternatively, the same effect is available by replacing the CCD 10 in the apparatus showed in FIG. 1 with a high speed camera that can capture an image quicker.

Since the magnification of the optical system depends on "distance s'/distance s" as showed in the formula (3), the magnification is adjustable by changing the position and/or the focal distance of the object lens 13. As the magnification of the optical system changes, the measurement resolution of the method for measuring a surface shape using the amplitude data also changes. Accordingly, the magnification of the optical system is adjusted in accordance with the size of the measured object 14 so that a wider viewing area of the measured object 14 can be measured at a time.

Figure 8:
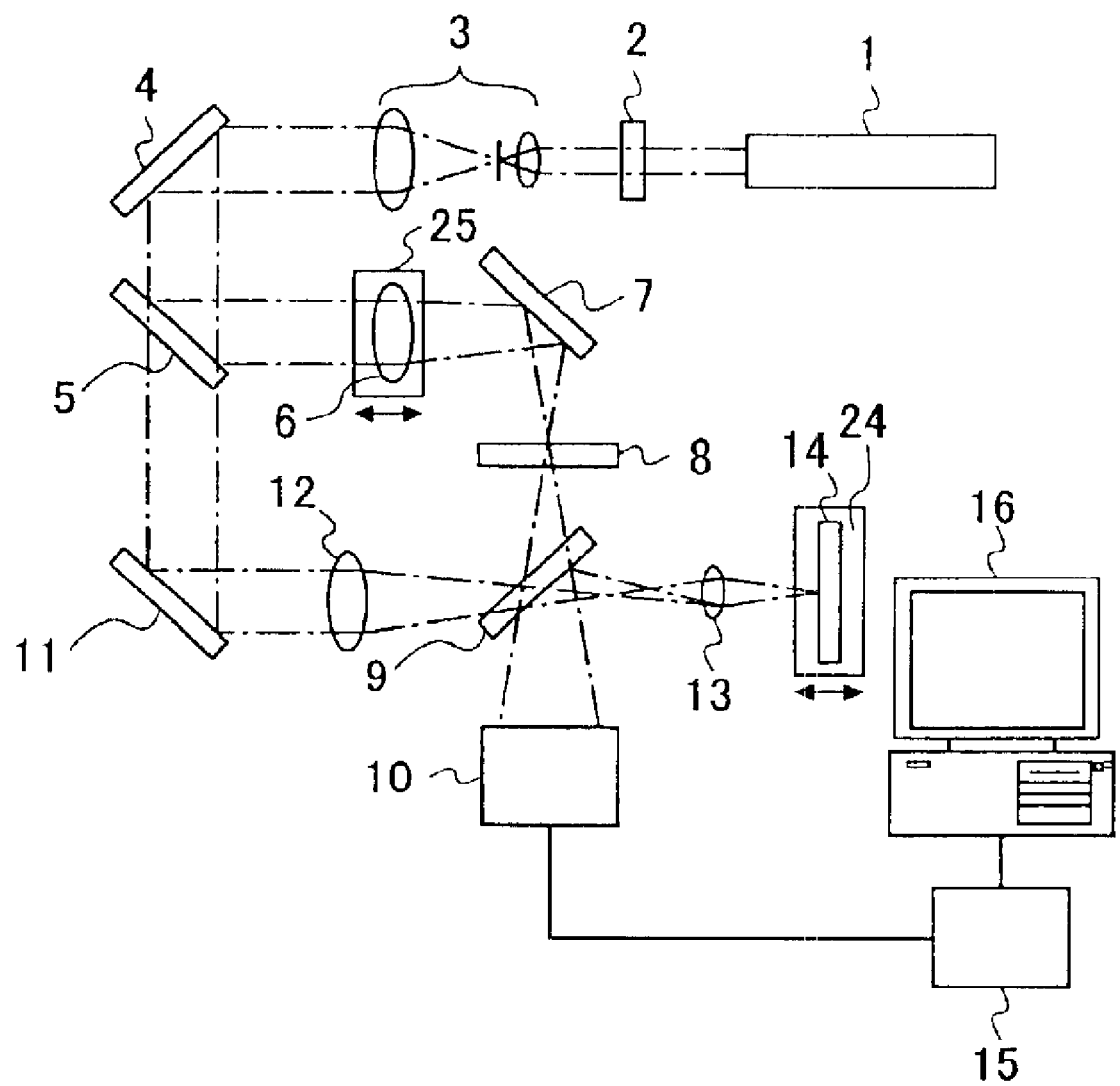
FIG. 8 is a block diagram showing the configuration of another apparatus for measuring surface shape according to another embodiment of the present invention.

The apparatus for measuring surface shape may be configured as showed in FIG. 8 instead of FIG. 1. In FIG. 8, components to which the same numerals as those assigned to components showed in FIG. 1 are assigned, are identical to the components showed in FIG. 1, and therefore, their detailed description is omitted.

In the configuration showed in FIG. 8, what is different from the configuration showed in FIG. 1 is that the apparatus is provided with a stage 24 that moves the measured object 14 substantially in the directions of the light axis so that the user can change the distance between the measured object 14 and the object lens 13.

When the distance between the measured object 14 and the object lens 13 changes, the distance s in the formula (3) changes and accordingly, the distance s' changes in a manner such that the formula (3) is satisfied. Accordingly, the user can change the magnification of the optical system.

Figure 5:
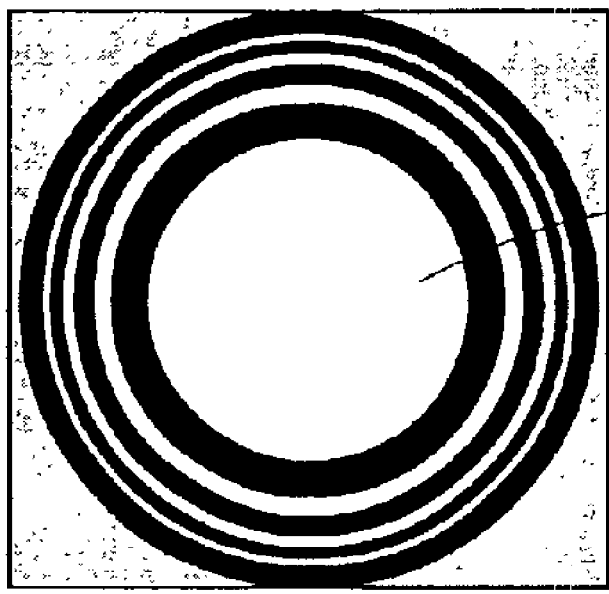
FIG. 5 is a schematic diagram showing defocus aberration.

The configuration showed in FIG. 8 is also different in that a stage 25 is provided to move the lens 6 substantially in the directions of the light axis. That is, the stage 25 is moved in response to the change in distance between the measured object 14 and the object lens 13 accompanying the move of the stage 24 and the curvature of the reflective light reflected by the measured object 14 and the curvature of the reference light at the position of the image capture by the CCD 10 are substantially equalized. Because of this difference, the magnification of the optical system is made possible without causing the defocus aberration (see FIG. 5) in the phase data calculated from the interference fringe data. One may provide another stage to move the CCD 10 in conformity with the change in the distance s'.

Figure 9:
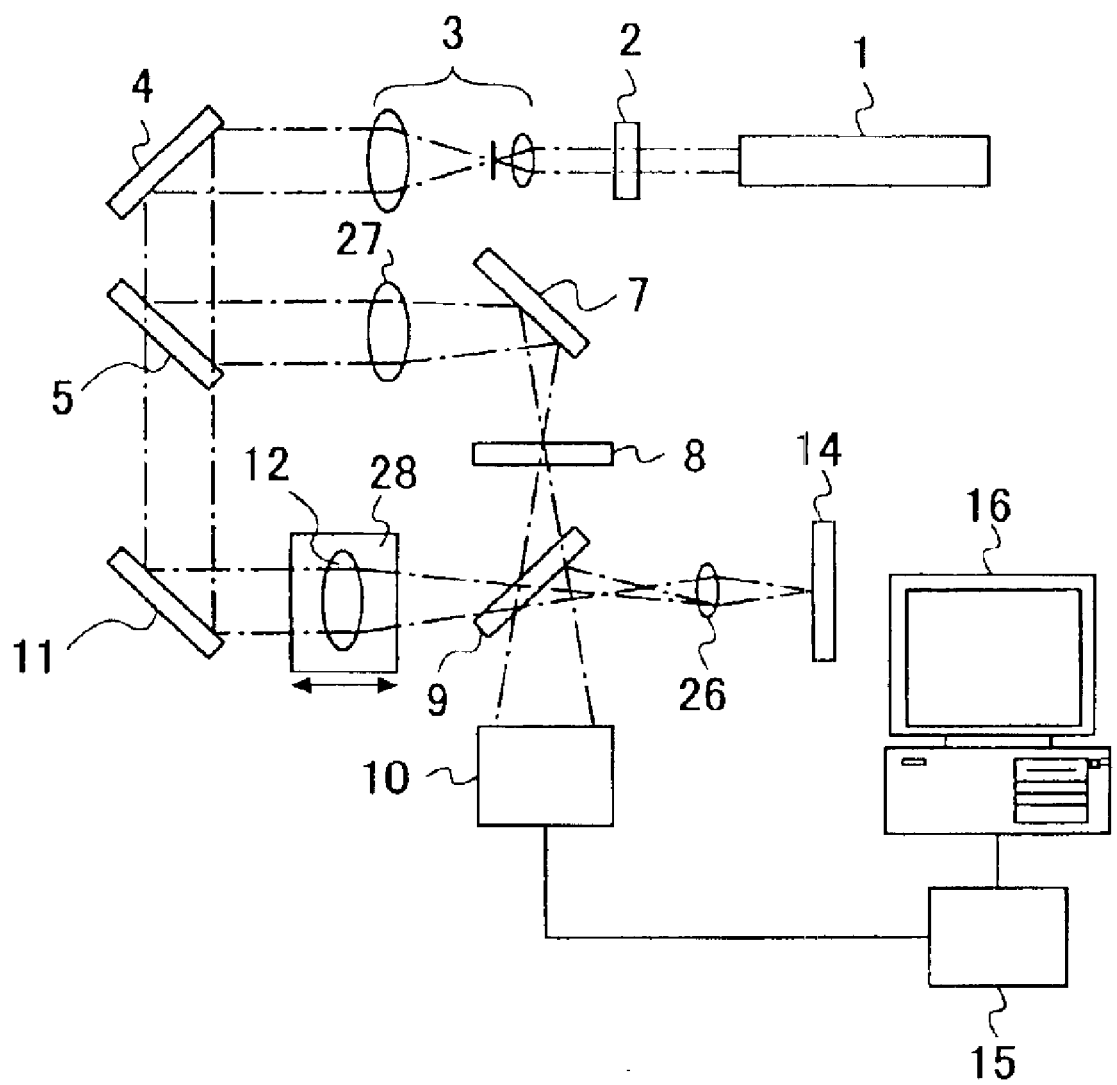
FIG. 9 is a block diagram showing the configuration of yet another apparatus for measuring surface shape according to yet another embodiment of the present invention.

An apparatus for measuring surface shape may be configured as showed in FIG. 9 instead of the configuration showed in FIG. 1. In FIG. 9, components sharing the same numerals assigned to components showed in FIG. 1 are identical to the components showed in FIG. 1, and accordingly, their detailed description is omitted.

The configuration showed in FIG. 9 is different from one showed in FIG. 1 in that the apparatus further includes the following: a variable focus lens 26 that converts the light reflected by the measured object 14 into a spherical wave, a variable focus lens 27 that converts the reference light into a spherical wave, and a stage 28 that moves the lens 12 substantially in the directions of the light axis.

The user can move the lens 12 by the stage 28 in conformity with the change in focal length of the variable focus lens 26 so that the variable focus lens 26 and the lens 12 form an afocal system together and the light output by the variable focus lens 26 to the measured object 14 becomes substantially parallel.

When the focal length of either the variable focus lens 26 or 27 is changed, the curvature of the spherical wave changes and consequently, the magnification also changes. However, the difference in curvature between the light reflected by the measured object 14 and the reference light causes the phase data calculated based on the interference fringes to include defocus aberration. To avoid this problem, the focal length of the variable focus lens 26 and that of the variable focus lens 27 are interlocked so that the curvature of the light reflected by the measured object 14 and that of the reference light do not differ at the imaging position of the CCD 10.

According to this embodiment, the user can change the magnification of the optical system without introducing defocus aberration into the calculated phase data based on the interference fringe data. Those skilled in the art may recognize that the difference in curvature between the reflected light and the reference light is eliminated by replacing the variable focus lens 26 or 27 with a fixed focus lens and moving the fixed focus lens with a stage movable substantially in the directions of the light axis. Moreover, because the focal length of the object lens 13 changes, one may provide a stage to move the CCD 10 in conformity with the change in the distance s' in response to the change in the distance s based on the formula (3).

By the way, in the above embodiments, the apparatus combines or compares the surface shape data obtained by the depth-from-focus theory with the surface shape data Tij obtained by the interference measurement theory and obtains the surface shape data Zij so that the apparatus can measure the surface shape of the measured object 14 including a step larger than ½ of the wavelength λ in the sub-fringe order.

However, besides the above embodiments, there is another technique to measure the surface shape based on the depth-from-focus theory. That is, the amplitude data are used to calculate the surface shape data Sij in the above embodiments. One may use the phase data, instead, as 2-dimensional data to be used in the depth-from-focus theory.

According to the depth-from-focus theory, a blur of the object image (in-focus measure) is measured as the reduction of contrast. In the case where the measured surface is as smooth as a mirror surface, the texture (pattern) of the object surface may not be observable and consequently, the reduction in contrast caused by the blur of the object image is not measurable. The depth-from-focus theory is useless to measure the surface shape in this case.

In such a case, one can use the phase data (the phase image) as 2-dimensional intensity data from which the object image is observable at a relatively high contrast compared to the amplitude data. That is, even if the surface is smooth, its texture becomes observable as the surface is optically magnified as long as the spatial resolution of the optical system exceeds the roughness of the surface. The measurement of the surface shape becomes possible by observing the phase image of the magnified surface having a relatively high contrast.

In this case, one may replace the step of applying the depth-from-focus theory to a micro region L of the amplitude data (step S5) in the flow chart showed in FIG. 7 with a step of applying the depth-from-focus theory to a micro region L of the phase data.

In the case where the surface shape is measured by the depth-from-focus method, the apparatus searches, for each image region, a position in the directions of the reflective light axis at which the image is in focus. Gathering the in-focus image obtained for each image region and corresponding position, the apparatus can generate an "entirely in-focus image" of which all image regions are in focus. Since an optical system having high magnification, such as a microscope, has a short focal length, it is difficult to adjust the position and the attitude of the measured object 14. The entirely in-focus image conveniently makes the adjustment easy in such a case.

The entirely in-focus image is generated based on a plurality of out-of-focus images obtained by repeating Fresnel's diffraction calculation. For each micro region L in the image, an in-focus distance D is determined, and then, the pixel data of an out-of-focus image at a position that is closest to the determined in-focus distance D is determined to be the pixel density of the micro region L. This operation is repeated for each micro region L so that the entirely in-focus image of which the entire image is in focus is generated in a short time period.

The entirely in-focus image is also available by calculating pixel density for each micro region L by Fresnel's diffraction using the interference fringe data and the determined in-focus distance D as a diffraction distance. The pixel density of the micro region L in the image obtained by Fresnel's diffraction is assigned to the micro region L of the same position of the entirely in-focus image. The entirely in-focus image that is more accurately focused in each micro region L is obtainable by repeating this operation for all micro regions.

The apparatus for measuring a surface shape according to the above embodiments causes the following effects.

The apparatus for measuring a surface shape showed in FIG. 1 obtains complex amplitude at a plurality of positions substantially in the directions of the optical axis of the light reflected by the measured object 14 and calculates the surface shape Sij of the measured object 14 by the depth-from-focus method that determines whether the portion of an image is in focus using the amplitude data.

In this case, since the measurement resolution and the measurement range in the directions of the optical axis are arbitrarily adjustable by changing the magnification of the optical system, the apparatus can measure a step of a height more than ½ of the wavelength λ that is not measurable by the laser interference when setting the measurement resolution smaller than ½ of the wavelength λ.

On the other hand, using the phase data of the complex amplitude obtained from the interference fringe data, the apparatus can measure a micro shape of the sub-fringe order in the same manner as the apparatus measures by the ordinary laser interference. Accordingly, the surface shape data Sij calculated based on the amplitude data are applied to a region including a step of a height greater than ½ of the wavelength λ and the surface shape data Tij calculated based on the phase data are applied to the other region. The apparatus can measure the surface including a step of a height more than ½ of the wavelength λ in the sub-fringe order by combining or comparing the surface shape data Sij and Tij.

Compared to a conventional scanning white light interference meter, when measuring a step of a height more than ½ of the wavelength λ, the apparatus according to the embodiment does not need to mechanically move the interference optical system and/or the measured object 14. Accordingly, the apparatus can reduce the risk of measurement error caused by the mechanical portion of the apparatus and the measurement range in the directions of the optical axis is not limited by a constraint of the movable range.

Whereas the measurement according to the conventional technique requires changing the focal length of lenses to obtain amplitude data, the measurement according to the embodiment obtains the amplitude data by calculating, based on the interference fringe data, the complex amplitude of the light reflected by the measured object 14 at a plurality of positions in the directions of the optical axis. The depth-from-focus method employed in the embodiment only requires the amplitude data contained in the calculated complex amplitude data and does not require movement of a mechanical portion in the optical system. Accordingly, the apparatus is not affected by a measurement error caused by the mechanical portion and its measurement range is not limited by the movable range of the mechanical portion.

The apparatus according to the embodiment can perform a measurement at high speed and as a result, can dynamically measure even moving objects because the apparatus does not require mechanical operation for the measurement.

Additionally, if the carrier frequency is superposed in the interference fringes, the complex amplitude of the light reflected by the measured object 14 is obtainable based on the single interference fringe data. The complex amplitude is available almost as soon as the CCD 10 completes the capturing of the interference fringe data because the time required for calculating of the complex amplitude is negligible compared with the time required for capturing of the interference fringe data. The conventional scanning white light interference meter that needs to capture a plurality of images or the conventional method that changes the focal length of lenses mechanically consume more time than the apparatus according to the embodiment does.

High speed measurement is possible in this manner. However, if the motion of the measured object 14 becomes faster than the speed of image capturing by the CCD 10, the apparatus cannot stably detect the light reflected by the measured object 14 and cannot accurately obtain the complex amplitude of the reflective light. To avoid this problem, a pulse of light that is short enough is applied to the measured object 14 so that the measured object 14 stays still while it is illuminated and the reflective light remains stable. Accordingly, the complex amplitude measured using the pulse of light and the measurement of the surface shape consequently becomes accurate.

A method of obtaining complex amplitude of light reflected by a vibrating object, by digital holography using a pulse light source is developed for the measurement of the transformation, the disposition, and the shape of the vibrating object. (See G. Pedrini, H. J. Tiziani, "Quantitative evaluation of two-dimensional dynamic deformations using digital holography", Optics & Laser Technology, Vol. 29, No. 5, pp 249–256, 1997, for example.) This method, however, targets only an object having a rough surface. The cited document does not describe a method of measuring the shape of the object at a wavelength level or a method of measuring a surface including a step of a height more than ½ of the wavelength $\lambda$.

In contrast to the above method, the apparatus for measuring a surface shape according to an embodiment can measure the surface shape of an object even if the object is very small and/or the surface is substantially mirror finished. The apparatus functions even if the surface includes a step of a height greater than ½ of the wavelength $\lambda$.

Additionally, the measurement resolution of this apparatus for measuring a surface shape can be adjusted by adjusting the magnification of the optical system in the case where the amplitude data are used for the measurement.

On the other hand, if a user desires to measure a surface including a step of a height greater than ½ of the wavelength $\lambda$, it is preferred that the resolution be smaller than ½ of the wavelength $\lambda$. Because the wavelength of the visible light is in the order of 1 nm, it is desired that the resolution of the interference optical system be increased in the case where the visible light is used for the measurement.

In this case, if either the light reflected from the measured object 14 or the reference light is converted into a spherical wave to adjust the magnification of the interference optical system, it is possible to make the measurement resolution high enough to observe a distance of ½ of the wavelength $\lambda$. However, if the curvature of the light reflected by the measured object 14 and the curvature of the reference light differ, the difference causes the defocus aberration in the phase data. The defocus aberration needs to be eliminated since it makes the accurate measurement of the surface shape of the measured object 14 difficult.

Accordingly, if one of the light reflected by the measured object 14 and the reference light is converted into a spherical wave, the other one can be also converted into a spherical wave so that their curvatures are substantially equal and the above defocus aberration is eliminated. In this manner, the apparatus can assure an accurate measurement even if the magnification of the optical system is raised.

This apparatus for measuring surface shape sets the resolution only for the surface shape measurement using the amplitude data, instead of the phase data, by adjusting the magnification of the optical system.

However, if the measurement resolution is set too high, that is, the magnification of the optical system is too great, the measurement range in the transverse directions (field of view) becomes small and the measuring of a wide range (field of view) on the surface of the measured object 14 at a time becomes difficult.

Accordingly, under the condition that the measurement resolution is set smaller than ½ of the wavelength $\lambda$, the magnification of the optical system of this apparatus for measuring surface shape is changed in accordance with the size of the measured object 14 so that a wider range (field of view) of the surface of the measured object 14 can be measured at a time.

In the case where the surface shape of the measured object 14 is measured by detecting the level of focus based on the depth-from-focus method, if the surface of the measured object 14 is too smooth to observe its texture optically, the detection of defocusing level becomes difficult.

The defocusing level is detected by the reduction of the contrast of the pattern on the surface of the measured object 14. Even in the case where the contrast of the 2-dimensional amplitude data is too low to detect the defocusing level, the 2-dimensional phase data may have enough contrast.

In that case, one can use the phase data as 2-dimensional intensity data to measure the surface shape of the measured object 14 by the depth-from-focus method. Accordingly, even if the surface of the measured object 14 is too smooth to observe the texture optically using the amplitude data, the measurement of the surface shape of the measured surface becomes possible, and the application of the apparatus is expanded.

When a user measures the shape of an object, it is convenient for the user that the user can observe the measured object 14 for disposing the measured object 14, adjusting the attitude, and so forth. Since, if the measured object 14 is too small, the user cannot see it by his/her naked eyes, it is convenient for the user that the user can observe the measured object 14 by optically magnifying. However, magnifying optical systems have short focal lengths, that is, a short range in the directions of the optical axis in which the image comes into focus, which results in difficulty in observing.

To the contrary, this apparatus for measuring surface shape measures the surface shape of the measured object 14 using the amplitude data by the depth-from-focus method. In that case, in order to obtain in-focus positions in the 2-dimensional images, this apparatus for measuring surface shape can generate and display the entirely in-focus image in which pixel data in all regions are in focus based on the calculated in-focus positions. The user can observe the position and the attitude of the measured object 14, which results in a maneuverable measurement (for a moving measured object 14).

In this case, the generating and displaying of images at a high speed are an important problem. This apparatus for measuring surface shape can generate the entirely in-focus image at a high speed by replacing the focused image in micro regions of the entirely in-focus image with the amplitude data of a position closest to the in-focus distance determined by detecting the focusing level. Accordingly, the measurement becomes accurate and maneuverable.

In the case where the entirely in-focus image is generated, the entirely in-focus image becomes more accurate if focused images of the micro regions in the entirely in-focus image are generated using Fresnel's diffraction calculation based on the in-focus distance determined by the focusing level. Since the user can adjust the position and the attitude of the measured object 14 more accurately, the measurement can be performed at high speed and more precisely.

The preferred embodiments of the present invention are described above. The present invention is not limited to these embodiments, but various variations and modifications may be made without departing from the scope of the present invention.

This patent application is based on Japanese priority patent application No. 2001-289786 filed on Sep. 21, 2001, the entire contents of which are hereby incorporated by reference.

What is claimed is:

1. An apparatus for measuring surface shape of an object, comprising:

a light source configured to emit light to illuminate said object;

an interference optical system configured to generate interference fringes between a reference fraction of said light and a reflective fraction of said light reflected by said object;

an imaging capturing unit configured to capture said interference fringes and output interference fringe data; and a computer unit configured to obtain phase data indicating the phase of said reflective fraction of said light and amplitude data indicating the amplitude of said reflective fraction of said light at a plurality of positions in the directions of the optical axis of said reflective fraction of said light using said interference fringe data, obtain first surface shape data indicating the surface shape of said object using said amplitude data by calculating an in-focus distance at each micro region of a plurality of micro regions and determining an in-focus position in the directions of the optical axis of said reflective fraction of said light, at which said reflective fraction of said light comes into focus, obtain second surface shape data indicating the surface shape of said object using said phase data by assigning the in-focus distance of each micro region of the plurality of micro regions and calculating a complex amplitude of each micro region, and obtain third surface shape data indicating the surface shape of said object by combining or comparing said first surface shape data with said second surface shape data.

2. The apparatus as claimed in claim 1, wherein said computer unit is further configured to obtain an entirely in-focus image of said object, the entire region of which is in focus, using at least one of said amplitude data and said phase data in order to obtain said first surface shape data.

3. The apparatus as claimed in claim 2, wherein said computer unit is further configured to replace an in-focus image of each micro region in said entirely in-focus image, with an item of said phase data at a position closest to said in-focus position.

4. The apparatus as claimed in claim 2, wherein said computer unit is further configured to obtain said first surface data by performing Fresnel's diffraction calculation using said in-focus position and focus image of a micro region.

5. The apparatus as claimed in claim 1, wherein magnification of said interference optical system is set at a value at which the resolution of said interference optical system in the directions of the axis of said reflective light becomes smaller than ½ of a wavelength of said light.

6. The apparatus as claimed in claim 1, wherein the plurality of positions at which said computer unit is configured to obtain said phase data and said amplitude data are arranged at intervals less than ½ of a wavelength of said light.

7. The apparatus as claimed in claim 1, wherein said computer unit, when combining said first surface shape data with said second surface shape data, is further configured to determine an order m in a formula "m×($\lambda$/2)+$\delta$" (m: order, $\lambda$: wavelength, $\delta$: said second surface shape data).

8. The apparatus as claimed in claim 1, wherein said interference fringes are superposed with a carrier frequency.

9. The apparatus as claimed in claim 1, wherein said light source is further configured to emit pulses of light to illuminate said object.

10. The apparatus as claimed in claim 1, wherein said interference optical system is further configured to convert said reference fraction of said light and said reflective fraction of said light reflected by said object into respective spherical waves that have substantially the same curvature at a position where said image capturing unit captures said interference fringes.

11. The apparatus as claimed in claim 1, wherein said interference optical system further comprises a magnification adjustment unit configured to change the magnification of said interference optical system; and said magnification adjustment unit adjusts at least one of measurement resolution and measurement range in the directions of said optical axis.

12. The apparatus as claimed in claim 11, wherein the magnification adjustment unit is further configured to interlock and substantially equalize the curvature of said reflective fraction of said light and the curvature of said reference fraction of said light.

13. An apparatus for measuring surface shape of an object, comprising:

a light source configured to emit light to illuminate said object;

an interference optical system configured to generate interference fringes between a reference fraction of said light and a reflective fraction of said light reflected by said object;

an imaging capturing unit configured to capture said interference fringes and output interference fringe data; and a computer unit configured to obtain phase data indicating the phase of said reflective fraction of said light at a plurality of positions in the directions of the optical axis of said reflective fraction of said light using said interference fringe data, obtain first surface shape data indicating the surface shape of said object using said phase data by calculating an in-focus distance at each micro region of a plurality of micro regions and determining an in-focus position in the directions of the optical axis of said reflective fraction of said light, at which said reflective fraction of said light comes into focus, obtain second surface shape data indicating the surface shape of said object using said phase data by assigning the in-focus distance of each micro region of the plurality of micro regions and calculating a complex amplitude of each micro region, and obtain third surface shape data indicating the surface shape of said object by combining or comparing said first surface shape data with said second surface shape data.

14. A method of measuring surface shape of an object, comprising:

capturing an image of interference fringes generated by a reflective fraction of light reflected by an object and a reference fraction of said light;

generating interference fringe data using the captured image of said interference fringes;

calculating, using the generated interference fringe data, phase data indicating the phase of said reflective fraction of said light and amplitude data indicating the amplitude of said reflective fraction of said light, at a plurality of positions in the directions of the optical axis of said reflective fraction of said light;

obtaining first surface shape data indicating the shape of said object by determining a focusing level using said amplitude data and calculating an in-focus distance at each micro region of a plurality of micro regions;

obtaining second surface share data indicating the surface shape of said object using said phase data by assigning the in-focus distance of each micro region of the plurality of micro regions and calculating a complex amplitude of each micro region; and obtaining third surface shape data indicating the surface shape of said object by combining or comparing said first surface shape data with said second surface shape data.

15. The method as claimed in claim 14, wherein said obtaining first surface shape data creates an entirely in-focus image of said object, using at least one of said amplitude data and said phase data in order to obtain said first surface shape data.

16. The method as claimed in claim 15, wherein said obtaining first share data includes replacing in-focus images of micro regions in said entirely in-focus image with said phase data of said micro regions at a position closest to an in-focus position.

17. The method as claimed in claim 15, wherein, said obtaining first surface shape data includes performing Fresnel's diffraction calculation using said in-focus distance determined by the focusing level to obtain in-focus images of micro regions in said entirely in-focus image.

18. A method of measuring surface shape of an object, comprising:

capturing an image of interference fringes generated by a reflective fraction of light reflected by an object and a reference fraction of said light;

generating interference fringe data using the captured image of said interference fringes;

calculating, using the generated interference fringe data, phase data indicating the phase of said reflective fraction of said light and amplitude data indicating the amplitude of said reflective fraction of said light, at a plurality of positions in the directions of the optical axis of said reflective fraction of said light;

obtaining first surface shape data indicating the shape of said object by calculating an in-focus distance at each micro region of a plurality of micro regions and determining a focusing level using said phase data;

obtaining second surface shape data indicating the surface shape of said object by assigning the in-focus distance of each micro region of the plurality of micro regions and calculating a complex amplitude of each micro region using said phase data; and obtaining third surface shape data indicating the surface shape of said object by combining or comparing said first surface shape data with said second surface shape data.

19. A computer program, which when executed by the computer system causes the computer system to perform a method comprising:

capturing an image of interference fringes generated by a reflective fraction of light reflected by an object and a reference fraction of said light;

generating interference fringe data using the captured image of said interference fringes;

calculating, using the generated interference fringe data, phase data indicating the phase of said reflective fraction of said light and amplitude data indicating the amplitude of said reflective fraction of said light, at a plurality of positions in the directions of the optical axis of said reflective fraction of said light;

obtaining first surface shape data indicating the shape of said object by determining a focusing level using said amplitude data and calculating an in-focus distance at each micro region of a plurality of micro regions;

obtaining second surface shape data indicating the surface shape of said object using said phase data by assigning the in-focus distance of each micro region of the plurality of micro regions and calculating a complex amplitude of each micro region; and obtaining third surface shape data indicating the surface shape of said object by combining or comparing said first surface shape data with said second surface shape data.

20. The computer program as claimed in claim 19, wherein the computer program further causes said computer to create an entirely in-focus image of said object, the entire region of which is in focus, using at least one of said amplitude data and said phase data in order to obtain said first surface shape data.

21. The computer program as claimed in claim 20, wherein the computer program further causes said computer to replace in-focus images of micro regions in said entirely in-focus image with said phase data of said micro regions at a position closest to said in-focus position in order to obtain said first surface shape data.

22. The computer program as claimed in claim 20, wherein the computer program further causes said computer to obtain in-focus images of micro regions in said entirely in-focus image by performing Fresnel's diffraction calculation using said in-focus distance determined by the focusing level.

23. A computer program, which when executed by the computer system causes the computer system to perform a method comprising:

capturing an image of interference fringes generated by a reflective fraction of light reflected by an object and a reference fraction of said light;

generating interference fringe data using the captured image of said interference fringes;

calculating, using the generated interference fringe data, phase data indicating the phase of said reflective fraction of said light and amplitude data indicating the amplitude of said reflective fraction of said light, at a plurality of positions in the directions of the optical axis of said reflective fraction of said light;

obtaining first surface shape data indicating the shape of said object by calculating an in-focus distance at each micro region of a plurality of micro regions and determining a focusing level using said phase data;

obtaining second surface shape data indicating the surface shape of said object by assigning the in-focus distance of each micro region of the plurality of micro regions and calculating a complex amplitude of each micro region using said phase data; and obtain third surface shape data indicating the surface shape of said object by combining or comparing said first surface shape data with said second surface shape data.

24. A computer program product storing program instructions for execution on a computer system, which when executed by the computer system causes the computer system to perform a method comprising:

capturing an image of interference fringes generated by a reflective fraction of light reflected by an object and a reference fraction of said light;

generating interference fringe data using the captured image of said interference fringes;

calculating, using the generated interference fringe data, phase data indicating the phase of said reflective fraction of said light and amplitude data indicating the amplitude of said reflective fraction of said light, at a plurality of positions in the directions of the optical axis of said reflective fraction of said light;

obtaining first surface shape data indicating the shape of said object by determining a focusing level using said amplitude data and calculating an in-focus distance at each micro region of a plurality of micro regions;

obtaining second surface shape data indicating the surface shape of said object using said phase data by assigning the in-focus distance of each micro region of the plurality of micro regions and calculating a complex amplitude of each micro region; and obtaining third surface shape data indicating the surface shape of said object by combining or comparing said first surface shape data with said second surface shape data.

25. The computer program product as claimed in claim 24, wherein the computer program further causes said computer to create an entirely in-focus image of said object, the entire region of which is in focus, using at least one of said amplitude data and said phase data in order to obtain said first surface shape data.

26. The computer program product as claimed in claim 25, wherein the computer program further causes said computer to replace in-focus images of micro regions in said entirely in-focus image with said phase data of said micro regions at a position closest to said in-focus position in order to obtain said first surface shape data.

27. The computer program product as claimed in claim 25, wherein the computer program further causes said computer to obtain in-focus images of micro regions in said entirely in-focus image by performing Fresnel's diffraction calculation using said in-focus distance determined by the focusing level.

28. A computer program product storing program instructions for execution on a computer system, which when executed by the computer system causes the computer system to perform a method comprising:

capturing an image of interference fringes generated by a reflective fraction of light reflected by an object and a reference fraction of said light;

generating interference fringe data using the captured image of said interference fringes;

calculating, using the generated interference fringe data, phase data indicating the phase of said reflective fraction of said light and amplitude data indicating the amplitude of said reflective fraction of said light, at a plurality of positions in the directions of the optical axis of said reflective fraction of said light;

obtaining first surface shape data indicating the shape of said object by calculating an in-focus distance at each micro region of a plurality of micro regions and determining a focusing level using said phase data;

obtaining second surface shape data indicating the surface shape of said object by assigning the in-focus distance of each micro region of the plurality of micro regions and calculating a complex amplitude of each micro region using said phase data; and obtain third surface shape data indicating the surface shape of said object by combining or comparing said first surface shape data with said second surface shape data.

29. An apparatus for measuring surface shape of an object, comprising:

a light source configured to emit light to illuminate said object;

an interference optical system configured to generate interference fringes between a reference fraction of said light and a reflective fraction of said light reflected by said object;

an imaging capturing unit configured to capture said interference fringes and output interference fringe data; and a computer unit configured to
obtain first surface shape data by determining an in-focus distance for a plurality of micro regions by calculating a complex amplitude at a reproduction distance using Fresnel's diffraction calculation for each micro region, obtaining an in-focus measure of the amplitude data of the complex amplitude for each micro region, and converting the in-focus distance into said first surface shape data, calculate an order at each pixel of a plurality of pixels, obtain second surface shape data by assigning the in-focus distance of each micro region as a reproduction distance, calculating the complex amplitude of each micro region by Fresnel's diffraction calculation, and converting phase data at each pixel of the plurality of pixels into said second surface shape data, and obtain third surface shape data indicating the surface shape of said object by at least one of combining and comparing said first surface shape data with said second surface shape data.

* * * * *